United States Patent
Yoo et al.

(10) Patent No.: US 10,655,003 B2
(45) Date of Patent: *May 19, 2020

(54) RESIN BLEND FOR MELTING PROCESS

(75) Inventors: Houng Sik Yoo, Seoul (KR); Jin Young Ryu, Daejeon (KR); Hak Shin Kim, Daejeon (KR); Eun Joo Choi, Daejeon (KR); Young Jun Hong, Daejeon (KR); Hyun Seok Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 164 days.

This patent is subject to a terminal disclaimer.

(21) Appl. No.: 13/879,504

(22) PCT Filed: Oct. 14, 2011

(86) PCT No.: PCT/KR2011/007680
§ 371 (c)(1),
(2), (4) Date: Aug. 23, 2013

(87) PCT Pub. No.: WO2012/050400
PCT Pub. Date: Apr. 19, 2012

(65) Prior Publication Data
US 2013/0330558 A1    Dec. 12, 2013

(30) Foreign Application Priority Data

Oct. 14, 2010  (KR) .................... 10-2010-0100384
Oct. 14, 2011  (KR) .................... 10-2011-0105358
Oct. 14, 2011  (KR) .................... 10-2011-0105361

(51) Int. Cl.
C08L 33/20    (2006.01)
C08L 101/02   (2006.01)
(Continued)

(52) U.S. Cl.
CPC ............. *C08L 33/20* (2013.01); *C08L 33/06* (2013.01); *C08L 33/14* (2013.01); *C08L 35/06* (2013.01);
(Continued)

(58) Field of Classification Search
None
See application file for complete search history.

(56) References Cited

U.S. PATENT DOCUMENTS 4,159,288 A    6/1979  Carson et al.
4,446,295 A    5/1984  Vasta
(Continued)

FOREIGN PATENT DOCUMENTS

CN    101360789 A    2/2009
CN    101495562 A    7/2009
(Continued)

OTHER PUBLICATIONS

Office Action issued in Chinese Patent Application No. 201180049849.2 dated Jul. 1, 2014 along with English translation, 18 pages.
(Continued)

*Primary Examiner* — Ronak C Patel
(74) *Attorney, Agent, or Firm* — Rothwell, Figg, Ernst & Manbeck, P.C.

(57) ABSTRACT

The present invention relates to a resin blend for a melting process, to a method for manufacturing a resin molding using same, and to a resin molding obtained thereby, the resin blend comprising a first resin and a second resin, wherein the second resin includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms, and has, with the first resin, a melt viscosity difference of 0.1 to 3,000 Pa*s at a
(Continued)

shear rate of 100 to 1,000 s$^{-1}$ and a processing temperature of the resin mixture, and a glass transition temperature ($T_g$) difference of 10° C. to 150° C.

6 Claims, 1 Drawing Sheet

(51) Int. Cl.
*C08L 33/06* (2006.01)
*C08L 35/06* (2006.01)
*C08L 33/14* (2006.01)

(52) U.S. Cl.
CPC ....... *C08L 101/02* (2013.01); *Y10T 428/2998* (2015.01); *Y10T 428/31536* (2015.04); *Y10T 428/31931* (2015.04)

(56) References Cited

U.S. PATENT DOCUMENTS

| | | |
|---|---|---|
| 4,711,938 A | 12/1987 | Suka |
| 4,849,479 A | 7/1989 | Siol et al. |
| 5,069,851 A | 12/1991 | Hicks |
| 5,218,014 A | 6/1993 | Matsumoto |
| 5,283,302 A | 2/1994 | Wakamori |
| 5,589,028 A | 12/1996 | Robinson |
| 5,605,763 A | 2/1997 | Yusa |
| 5,629,393 A | 5/1997 | Varshney |
| 5,693,928 A | 12/1997 | Egitto |
| 5,723,559 A | 3/1998 | Varshney |
| 5,859,176 A | 1/1999 | Nkahashi |
| 5,889,114 A * | 3/1999 | Statz .............................. 525/166 |
| 6,051,644 A | 4/2000 | Wilson |
| 6,096,393 A | 8/2000 | Ikeda |
| 6,187,874 B1 | 2/2001 | Yoshioka |
| 6,210,856 B1 * | 4/2001 | Lin et al. .................... 430/270.1 |
| 6,255,395 B1 | 7/2001 | Klosiewicz |
| 6,339,121 B1 | 1/2002 | Rafailovich |
| 6,455,171 B2 | 9/2002 | Scheibelhoffer |
| 6,495,244 B1 | 12/2002 | Andresakis |
| 6,565,763 B1 | 5/2003 | Asakawa |
| 6,591,871 B2 | 7/2003 | Smith |
| 6,818,173 B1 | 11/2004 | Khait |
| 6,849,314 B2 | 2/2005 | Jing |
| 7,258,923 B2 | 8/2007 | Bogerd |
| 7,323,232 B2 * | 1/2008 | Takeda ................ G02F 1/13394 313/257 |
| 7,544,420 B2 | 6/2009 | Domine |
| 7,758,951 B2 | 7/2010 | Takeuchi |
| 7,985,822 B2 | 7/2011 | Ogura |
| 8,969,490 B2 | 3/2015 | Ohigashi et al. |
| 9,000,112 B2 | 4/2015 | Ryu |
| 9,044,924 B2 | 6/2015 | Yoo |
| 9,193,857 B2 | 11/2015 | Ryu |
| 9,243,134 B2 | 1/2016 | Ryu |
| 9,278,505 B2 | 3/2016 | Shim |
| 9,296,178 B2 | 3/2016 | Yoo |
| 9,296,888 B2 | 3/2016 | Ryu |
| 9,481,149 B2 | 11/2016 | Yoo |
| 9,644,086 B2 | 5/2017 | Ryu |
| 2003/0026974 A1 | 2/2003 | Lenox |
| 2003/0047229 A1 | 3/2003 | Smith |
| 2003/0198769 A1 | 10/2003 | Jing |
| 2004/0049006 A1 | 3/2004 | Aramaki |
| 2004/0171773 A1 | 9/2004 | Bu |
| 2004/0265551 A1 | 12/2004 | Takaya |
| 2005/0159533 A1 * | 7/2005 | Nabeshima .............. C08L 51/00 524/494 |
| 2005/0196552 A1 | 9/2005 | Lehmann |
| 2005/0234199 A1 * | 10/2005 | Taniguchi ........... C08F 293/005 525/242 |
| 2006/0199871 A1 | 9/2006 | Hale |
| 2007/0231576 A1 | 10/2007 | Davis |
| 2008/0160289 A1 | 7/2008 | Jun |
| 2008/0166511 A1 * | 7/2008 | Honma .................. C08G 59/50 428/36.4 |
| 2008/0254308 A1 | 10/2008 | Thomasson |
| 2008/0305323 A1 | 12/2008 | Dhawan |
| 2009/0017256 A1 * | 1/2009 | Hunt ..................... C08F 290/06 428/141 |
| 2010/0000601 A1 | 1/2010 | Burchill |
| 2010/0168355 A1 | 7/2010 | Shih |
| 2010/0182694 A1 * | 7/2010 | Endo .......................... C08J 5/18 359/489.2 |
| 2010/0249272 A1 | 9/2010 | Kim |
| 2011/0152394 A1 | 6/2011 | Pyun |
| 2011/0297896 A1 * | 12/2011 | Kim ...................... C08F 220/18 252/585 |
| 2011/0315189 A1 | 12/2011 | Ge |
| 2012/0302676 A1 * | 11/2012 | Oya .......................... C08J 5/18 524/89 |
| 2013/0045650 A1 | 2/2013 | Ogashiwa |
| 2013/0136930 A1 | 5/2013 | Kato |

FOREIGN PATENT DOCUMENTS

| | | |
|---|---|---|
| FR | 2374361 A1 | 7/1978 |
| JP | S61190503 A | 8/1986 |
| JP | 63-89556 A | 4/1988 |
| JP | 03-296554 A | 12/1991 |
| JP | H05140526 A | 6/1993 |
| JP | H08193148 A | 7/1996 |
| JP | 2000-239532 A | 9/2000 |
| JP | 2001232730 A | 8/2001 |
| JP | 2004148775 A | 5/2004 |
| JP | 2004204122 A | 7/2004 |
| JP | 2005281394 A | 10/2005 |
| JP | 2006089734 A | 4/2006 |
| JP | 2006143850 A | 6/2006 |
| JP | 2006265540 A | 10/2006 |
| JP | 2006306916 A | 11/2006 |
| JP | 2007-224290 A | 9/2007 |
| JP | 2007332187 A | 12/2007 |
| JP | 2008239924 A | 10/2008 |
| JP | 2008248072 A | 10/2008 |
| JP | 2008303282 A | 12/2008 |
| JP | 2009242657 A | 10/2009 |
| JP | 2010285523 A | 12/2010 |
| JP | 2011074397 A | 4/2011 |
| KR | 10-2008-0072740 A | 8/2008 |
| WO | 1999019402 A1 | 4/1999 |
| WO | 20071140101 A1 | 12/2007 |
| WO | 2009134653 A1 | 11/2009 |
| WO | WO 2011/093478 * | 8/2011 |

OTHER PUBLICATIONS

International Search Report issued in International Appln. No. PCT/KR2011/007680, dated May 16, 2012, 2 pages.
Supplementary European Search Report issued in European Patent Application No. 11832787.3 dated Feb. 17, 2014, 8 pages.
J. Brandrup et al.: "Polymer Handbook," 1999, Wiley-Interscience, New York, US, XP002719770, pp. VI/199, VI203-VI/204.
European Patent Office Communication issued in European Patent Application No. 11832787.3 dated Jul. 8, 2015, 4 pages.

* cited by examiner

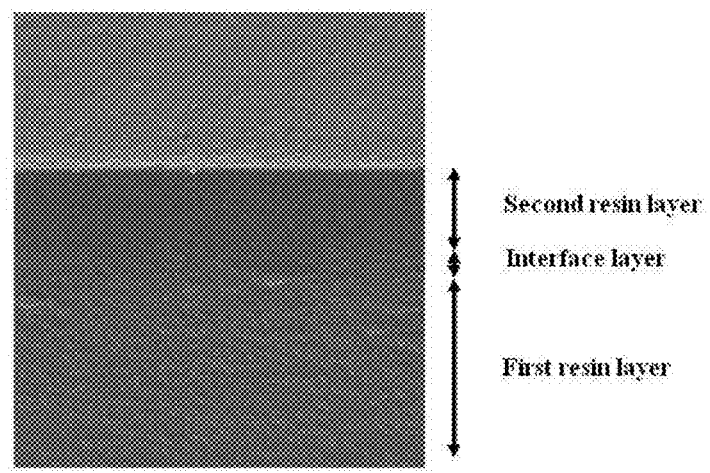

RESIN BLEND FOR MELTING PROCESS

BACKGROUND

1. Field of the Invention

The present application relates to a resin blend for a melting process, a pellet, and a method of preparing a resin-molded article using the same, and, more particularly, to a resin blend for a melting process capable of improving mechanical properties and surface hardness of a molded article and also exhibiting effects of reducing a processing time, enhancing productivity and cutting the production cost by eliminating an additional surface coating step, a pellet, and a method of preparing a resin-molded article using the same.

2. Discussion of Related Art

Plastic resins are easily processed, and have excellent physical properties such as tensile strength, elastic modulus, heat resistance and impact strength. Therefore, the plastic resins have been used in various applications such as automotive parts, helmets, parts of electronic equipment, parts of a spinning machine, toys, or pipes.

In particular, since electric home appliances are used in living spaces, the plastic resins require functions of the electric home appliances themselves, and functions as in interior decorations as well. Also, since automotive parts and toys come in direct contact with human bodies, the plastic resins should be environmentally friendly and have excellent surface hardness. However, when plastic resins are exposed to external environments for a certain period of time, the plastic resins generally decompose and are discolored easily by oxygen in the air, ozone, light and the like. Therefore, the plastic resins have a problem in that they are easily breakable due to low weather resistance and very low impact strength. As a result, a method of applying an additional painting or plating process to make up for the weak points of the plastic resins and improve surface characteristics has been generally used. However, such a painting or plating process has problems in that it may degrade efficiency and economic feasibility of a process of preparing a plastic resin, and use of the painting or plating process results in generation of a large amount of toxic substances during the process itself or disposal of products.

To solve these problems, various methods have been proposed to improve surface characteristics of plastic resins without using the painting or plating process. A method of adding inorganic particles to a plastic resin has been proposed to improve physical properties such as wear resistance and hardness. However, such a method has problems in that processability of the plastic resin may be degraded and a decrease in impact strength and gloss may be caused by addition of the inorganic particles. Also, a method of further adding a resin having high hardness or excellent heat resistance has been proposed to improve surface characteristics of a plastic resin. However, such a method has problems in that it requires an additional process such as curing a product after an injection process, and surface hardness of the product is not improved to a desired level.

Accordingly, there is an increasing demand for development of methods capable of enhancing efficiency and economic feasibility of the process without performing a process of painting or plating a plastic resin, and improving mechanical properties and surface hardness of a molded article as well.

SUMMARY OF THE INVENTION

The present application is directed to providing a resin blend for a melting process capable of improving mechanical properties and surface hardness of a molded article and also exhibiting effects of reducing a processing time, enhancing productivity and cutting the production cost by eliminating an additional surface coating step.

Also, the present application is directed to providing a pellet prepared using the resin blend for a melting process.

In addition, the present application is directed to providing a method of preparing a resin-molded article using the resin blend for a melting process.

Furthermore, the present application is directed to providing a resin-molded article having improved surface hardness.

One aspect of the present application provides a resin blend for a melting process including a first resin and a second resin. Here, the second resin includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms, and has a melt viscosity difference of 0.1 to 3,000 Pa*s at a shear rate of 100 to 1,000 $s^{-1}$ and a processing temperature of the resin blend and a glass transition temperature (Tg) difference of 10° C. to 150° C. with respect to the first resin.

Another aspect of the present application provides a pellet including a core including a first resin and a shell including a second resin. Here the second resin includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms, and has a melt viscosity difference of 0.1 to 3,000 Pa*s at a shear rate of 100 to 1,000 $s^{-1}$ and a processing temperature of the resin blend and a glass transition temperature (Tg) difference of 10° C. to 150° C. with respect to the first resin.

Still another aspect of the present application provides a melt-processed resin-molded article including a first resin layer, a second resin layer formed on the first resin layer, and an interfacial layer formed between the first resin layer and the second resin layer and including a first resin and a second resin. Here the second resin layer includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms.

Still another aspect of the present application provides a melt-processed resin-molded article including a first resin layer and a second resin layer formed on the first resin layer. Here, components of the first resin layer on a surface of the second resin layer are detected by means of an infrared spectrometer (IR), and the second resin layer includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms.

Yet another aspect of the present application provides a method of preparing a resin-molded article. Here, the method includes melt-processing the resin blend.

Hereinafter, the resin blend for a melting process, the pellet, the method of preparing a resin-molded article using the same, and the resin-molded article according to specific exemplary embodiments of the present application will be described in further detail.

In the present application, the term "blend" means a case in which a first resin and a second resin are uniformly mixed in one matrix, and a case in which a pellet formed of the first resin and a pellet formed of the second resin are uniformly mixed. For example, when the first resin and the second resin are uniformly mixed in the one matrix, it means that the first resin and the second resin are uniformly mixed in one pellet, and then present in the form of a composition.

The term "melt processing" refers to a process of processing a resin by melting the resin at a temperature greater than or equal to a melting temperature ($T_m$), for example, injection, extrusion, blowing or foaming.

The term "layer separation" means a case in which a layer-separated region (for example, a second-resin-rich region) forms a separate layer which may be observed separately from the remaining resin region (for example, a first-resin-rich region). That is, a structure formed by the layer separation is different from a structure in which the remaining resin region and the layer-separated region are partially distributed in an entire resin blend, for example, a sea-island structure. For example, the remaining resin region and the layer-separated region may be continuously present as separate layers. Such layer separation is performed by separating a certain structure into two layers. However, the structure may be separated into three or more layers, as necessary.

The present inventors have experimentally found that, when a first resin and a second resin having a bulky organic functional group are used herein, layer separation may occur according to different physical properties of the first and second resins, and use of the layer separation may allow the first and second resins to exhibit an effect of selectively coating a surface of a pellet or a molded article without using a separate additional process during or after the melt processing process. Therefore, the present application has been completed from the results. Especially, since the second resin having a bulky organic functional group has a lower melt viscosity than the first resin due to an increase in hydrodynamic volume, the layer separation may occur easily in a melt processing process such as extrusion or injection. For example, the second resin may be positioned or distributed at a position coming in contact with the air so as to form a surface layer of the pellet or the molded article to be molded. As a result, when the resin blend for a melting process is used, a resin-molded article having excellent mechanical properties and high surface hardness may be obtained without applying an additional coating process.

According to one exemplary embodiment of the present application, a resin blend for a melting process including a first resin and a second resin may be provided. Here, the second resin includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms, and has a melt viscosity difference of 0.1 to 3,000 Pa*s at a shear rate of 100 to 1,000 s$^{-1}$ and a processing temperature of the resin blend and a glass transition temperature (Tg) difference of 10° C. to 150° C. with respect to the first resin.

The melt viscosity difference between the first resin and the second resin at the shear rate of 100 to 1,000 s$^{-1}$ and the processing temperature of the resin blend may be in a range of 0.1 to 3,000 Pa*s, 1 to 2,000 Pa*s, or 1 to 1,000 Pa*s. When the melt viscosity difference is very small, the first resin is easily miscible with the second resin, which makes it difficult to facilitate the layer separation. On the other hand, when the melt viscosity difference is very high, the first resin may be peeled from the second resin without binding to the second resin.

The melt viscosity may be measured using capillary flow, and refers to a shear viscosity (Pa*s) according to a certain processing temperature and shear rate (/s).

The 'shear rate' refers to a shear rate applied when processing the resin blend. As a result, the shear rate may be adjusted according to a processing method.

The 'processing temperature' refers to a temperature at which the resin blend is processed. For example, when the resin blend is subjected to melt processing such as extrusion or injection, the processing temperature means a temperature applied in the melt processing process. The processing temperature may be adjusted according to the kind of resins subjected to the melt processing such as extrusion or injection. For example, a resin blend including a first resin of an acrylonitrile butadiene styrene (ABS) resin and a second resin obtained from a methyl methacrylate-based monomer may have a processing temperature of 210 to 240° C.

Also, a difference in glass transition temperature between the first resin and the second resin may be 10° C. or more, or 30° C. or more. When the difference in glass transition temperature between the first resin and the second resin is 10° C. or more, the second resin having a high glass transition temperature may be distributed at an outer part of the resin-molded article, thereby significantly improving surface hardness. An upper limit of the difference in glass transition temperature is not particularly limited. However, when the upper limit exceeds 150° C., the resin may become brittle, and thus may exhibit poor processability. As a result, the upper limit of the difference in glass transition temperature is less than or equal to 150° C.

The second resin refers to a resin which exhibits a difference in physical properties with respect to the first resin as described above, and provides a surface of a desired molded article with excellent mechanical properties and high surface hardness. In particular, the second resin may include a polymer resin which has a volume greater than or equal to a predetermined size and contains a bulky organic functional group. As the certain bulky organic functional group is introduced, the polymer resin may have a lower melt viscosity. Therefore, the polymer resin having the bulky organic functional group may move a surface of the resin blend, which may easily come in contact with the air in the resin blend, and thus the above-described layer separation may occur more easily in the process such as extrusion or injection. In addition, as the bulky organic functional group is introduced, the second resin may have a higher glass transition temperature during the melt processing process such as extrusion or injection. As a result, surface hardness of a final molded article may be further enhanced.

Specific examples of the bulky organic functional group may include an alkyl group having 2 to 20 carbon atoms; an alicyclic ring having 5 to 40 carbon atoms, and an aromatic ring having 6 to 40 carbon atoms. However, the kind of the functional group having a high hydrodynamic volume is not particularly limited. For example, one or more organic functional groups may be introduced into the polymer resin included in the second resin.

In one example, the alkyl group may have 2 to 20 carbon atoms, 2 to 12 carbon atoms, or 2 to 6 carbon atoms, the alicyclic ring may have 5 to 40 carbon atoms, or 5 to 16 carbon atoms, and the aromatic ring may have 6 to 40 carbon atoms, or 6 to 20 carbon atoms.

More particularly, the second resin may include an aliphatic functional group such as tert-butyl, isobutyl or isopropyl; an alicyclic ring functional group such as isobornyl or cyclohexyl; and an aromatic ring functional group such as naphthyl, phenyl, anthracenyl or benzyl.

Also, the kind of the polymer resin having a bulky organic functional group having a volume greater than or equal to a predetermined size is not particularly limited, but a (meth) acrylate-based resin is used herein.

The (meth)acrylate-based resin is a polymer including an acrylic or methacrylic monomer as a main component. For example, in addition to methacrylate and acrylate, the (meth) acrylate-based resin may include an alkyl methacrylate such as methyl methacrylate, ethyl methacrylate, propyl methacrylate, butyl methacrylate, cyclohexyl methacrylate, octyl methacrylate, lauryl methacrylate or stearyl methacrylate; or an alkylacrylate such as methylacrylate, ethylacrylate, propylacrylate, butylacrylate, octylacrylate, laurylacrylate or stearylacrylate, but the present application is not limited thereto.

The resin blend for a melting process may include the second resin at 0.1 to 50 parts by weight, or 1 to 30 parts by weight, based on 100 parts by weight of the first resin.

When the second resin is included at a content less than 0.1 parts by weight, based on 100 parts by weight of the first resin, the layer separation does not occur, whereas an increase in production cost may be caused when the second resin is included at a content greater than 50 parts by weight.

The resin blend for a melting process may be prepared into a pellet. The pellet prepared using the resin blend may have a structure in which the first resin is disposed at a central portion thereof and the second resin is layer-separated from the first resin to be disposed at a surface thereof.

According to one exemplary embodiment of the present application, a pellet including a core including a first resin and a shell including a second resin may be provided. Here, the second resin includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms, and has a melt viscosity difference of 0.1 to 3,000 Pa*s at a shear rate of 100 to 1,000 s$^{-1}$ and a processing temperature of the resin blend and a glass transition temperature (Tg) difference of 10° C. to 150° C. with respect to the first resin.

The details of the kinds and physical properties of the first resin and the second resin have been described above, and thus detailed description thereof is omitted for clarity.

Meanwhile, according to still another exemplary embodiment of the present application, a method of preparing a resin-molded article may be provided. Here, the method includes melt-processing the resin blend for a melting process.

As described above, since the second resin has a lower melt viscosity than the first resin, layer separation may occur during extrusion or injection of the resin blend. As a result, the layer separation may result in an effect of selectively coating a surface of a pellet or a molded article without performing a separate additional process.

In particular, since the second resin according to one exemplary embodiment of the present application may have a lower melt viscosity and a higher glass transition temperature when the above-described specific organic functional group is introduced into the second resin, the second resin may move more easily to a surface of a molded article coming in contact with the air, and the layer separation may occur more easily during a process such as extrusion or injection. As a result, since a high-hardness resin having a relatively higher glass transition temperature is disposed at a surface of the molded article, the molded article having improved mechanical properties and surface characteristics may be provided.

Also, the melt processing may be performed under a shear stress. For example, the melt processing may include injection and extrusion, but the present application is not limited thereto.

The resin blend for a melting process may be prepared into a pellet using a melt processing process such as extrusion. Also, the resin blend may be prepared into a pellet through extrusion, and the pellet may then be prepared into a molded article through a melt processing process such as injection. In addition, the resin blend may be prepared into a molded article through direct injection.

The temperature used may vary according to the kinds of the first and second resins used in the process of extruding or injecting the resin blend.

The method of preparing a resin-molded article may further include curing a product obtained by melt-processing the resin blend, that is, a melt-processed article of the resin blend.

Meanwhile, the method of preparing a resin-molded article may further include forming a second resin before melt-processing the resin blend for a melting process. In the forming of the second resin, a method such as bulk polymerization, solution polymerization, suspension polymerization or emulsion polymerization may be used.

The forming of the second resin may include dispersing a polymer resin, which has at least one organic functional group selected from the group consisting of an alkyl group having 2 to 20 carbon atoms, an alicyclic ring having 5 to 40 carbon atoms and an aromatic ring having 6 to 40 carbon atoms, in a reaction solvent; adding at least one additive selected from the group consisting of a chain transfer agent, an initiator and a dispersion stabilizer to the reaction solvent and mixing the additive with the reaction solvent; and reacting the resulting blend at a temperature of 40° C. or more (polymerization step).

Any reaction solvent may be used without limitation as long as it is generally known to be able to be used to prepare a synthetic resin, a polymer or a copolymer. Examples of such a reaction solvent may include methyl isobutyl ketone, distilled water and the like.

As the chain transfer agent which may be added to the reaction solvent, an alkyl mercaptan such as n-butyl mercaptan, n-dodecyl mercaptan, tert-dodecyl mercaptan, isopropyl mercaptan or n-aryl mercaptan; a halogen compound such as carbon tetrachloride; or an aromatic compound such as an α-methylstyrene dimer or an α-ethylstyrene dimer may be used, but the present application is not limited thereto.

As the initiator, a polymerization initiator generally known to be able to be used in suspension polymerization, for example, a peroxide such as octanoyl peroxide, decanoyl peroxide or lauroyl peroxide or an azo-based compound such as azobisisobutyronitrile or azobis-(2,4-dimethyl)-valeronitrile, may be used without particular limitation.

Examples of the dispersion stabilizer which may be included in the reaction solvent may include an organic dispersing agent such as polyvinyl alcohol, polyolefin-maleic acid, or cellulose, or an inorganic dispersing agent such as tricalcium phosphate, but the present application is not limited thereto.

The details of the first resin and the second resin have been described above, and thus detailed description thereof is omitted for clarity.

Meanwhile, according to still another exemplary embodiment of the present application, a melt-processed resin-molded article including a first resin layer, a second resin layer formed on the first resin layer, and an interfacial layer formed between the first resin layer and the second resin layer and including a first resin and a second resin may be provided. Here, the second resin layer includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms.

The resin-molded article, which is prepared from the resin blend including the first resin and the second resin including the above-described polymer resin having a certain organic functional group, may have a layer separation structure in which a first resin layer is disposed at an inner part thereof and a second resin layer is formed on a surface thereof.

The melt viscosity difference may facilitate layer separation of the first resin and the second resin during a process such as extrusion or injection and movement of the second resin to the surface of the resin-molded article. As a result, the resin-molded article having a structure in which the first resin layer is disposed at an inner part thereof and the second resin layer is disposed on a surface thereof may be provided. Such a resin-molded article may realize improved mechanical properties and high surface hardness, thereby eliminating a coating or painting process to improve surface characteristics, reducing a processing time for production and the production cost and enhancing productivity of a final product.

The structure of the resin-molded article, that is, a structure in which the first resin layer and the second resin layer are divided by the interfacial layer and the second resin layer is exposed to an external environment, is a novel structure not known in the related art. When a typical resin is subjected to injection or extrusion, it is impossible to form such a structure, and it is also difficult to realize the effects according to the structure.

In particular, since the second resin includes the above-described polymer resin having a certain organic functional group, the second resin may have a lower melt viscosity. Therefore, the second resin may move more easily to a surface of the resin-molded article coming in contact with the air, and the layer separation may occur more easily during a process such as extrusion or injection. Also, the introduction of the bulky organic functional group may allow the second resin to have a higher glass transition temperature after the process such as extrusion or injection, thereby further enhancing surface hardness of the resin-molded article.

The 'first resin layer' refers to an inner region of a resin-molded article which predominantly includes the first resin. Also, the 'second resin layer' refers to an outer region of the resin-molded article which predominantly includes the second resin and endows a surface of the molded article with some functions.

Meanwhile, the resin-molded article may include an interfacial layer which is formed between the first resin layer and the second resin layer and includes a resin blend of first and second resins. The interfacial layer formed between the layer-separated first resin layer and the second resin layer may serve as a boundary, and may include the resin blend of first and second resins. In the resin blend, the first resin and the second resin may be physically or chemically bound to each other. Also, the first resin layer may be bound to second resin layer via the resin blend.

As described above, the resin-molded article may have a structure in which the first resin layer and the second resin layer are divided by the interfacial layer and the second resin layer is exposed to an external environment. For example, the molded article may have a structure in which the first resin layer, the interfacial layer and the second resin layer are sequentially stacked in this sequence, or in which an interface and a second resin are stacked at upper and lower ends of the first resin. Also, the resin-molded article may have a structure in which the interface and the second resin layer sequentially surround the first resin layer having various 3D shapes, for example spherical, round, polyhedral and sheet-type shapes.

The layer separation observed in the melt-processed resin-molded article seems to occur when certain first and second resins having different physical properties are used to prepare a melt-processed resin-molded article. Examples of the different physical properties may include melt viscosity. The details of the difference in physical properties are as described above.

Meanwhile, the first resin layer, the second resin layer and the interfacial layer may be confirmed using a scanning electron microscope (SEM) by subjecting each test sample to a low-temperature impact test, followed by etching a fracture surface of the test sample with THF vapor. Also, the thickness of each layer may be measured by cutting a test sample using a diamond blade of microtoming equipment, making a cut section smooth and etching the smooth section with a solution which may be prepared to dissolve the second resin relatively more easily than the first resin. Different portions of the smooth section may be etched to different extents according to the contents of the first resin and the second resin, and the first resin layer, the second resin layer, the interfacial layer and a surface of the test sample may be observed by a shade difference, as viewed from a surface of the test sample at an angle of 45° using an SEM. Then, the thickness of each layer may be measured based on these facts. In the present application, a 1,2-dichloroethane solution (10% by volume in EtOH) is used as the solution prepared to relatively more easily dissolve the second resin, but this is described for purposes of illustration only. Therefore, solutions in which the second resin has higher solubility than the first resin are not particularly limited, and may be altered according to the kind and compositions of the second resin.

The interfacial layer may have a thickness of 0.01 to 95%, or 0.1 to 70%, based on the sum of thicknesses of the second resin layer and the interfacial layer. When the interfacial layer has a thickness of 0.01 to 95% based on the sum of thicknesses of the second resin layer and the interfacial layer, peeling between the first resin layer and the second resin layer does not take place due to excellent interfacial bond strength between the first resin layer and the second resin layer, and surface characteristics may be drastically improved due to the presence of the second resin layer. On the other hand, when the interfacial layer is much smaller in thickness than the second resin layer, peeling between the first resin layer and the second resin layer may take place due to low bond strength between the first resin layer and the second resin layer, whereas the surface characteristics may be slightly improved by the presence of the second resin layer when the interfacial layer is much higher in thickness than the second resin layer.

The second resin may have a thickness of 0.01 to 60%, or 1 to 40%, based on a total thickness of the resin-molded article. When the second resin has a thickness within a predetermined thickness range, a surface of a molded article may be endowed with some functions. When the second resin has a very small thickness, it is difficult to sufficiently improve surface characteristics of the molded article. On the other hand, when the second resin has a very high thickness, mechanical properties of a functional resin itself may be reflected in the resin-molded article to alter mechanical properties of the first resin.

The details of the first resin, the second resin, the difference in physical properties between the first resin and the second resin, and the polymer having a certain organic functional group included in the second resin have been described above, and thus detailed description thereof is omitted for clarity.

Meanwhile, according to still another exemplary embodiment of the present application, a melt-processed resin-molded article including a first resin layer and a second resin layer formed on the first resin layer may be provided. Here, components of the first resin layer on a surface of the second resin layer are detected by means of an infrared spectrometer (IR), and the second resin layer includes a polymer resin having at least one organic functional group selected from the group consisting of an alkyl group having 2 to 20 carbon atoms, an alicyclic ring having 5 to 40 carbon atoms and an aromatic ring having 6 to 40 carbon atoms.

The structure of the molded article, that is, a structure in which the components of the first resin layer on the surface of the second resin layer are detected by means of the IR, is a novel structure not known in the related art. In the coating process, it is generally difficult to detect the components of the first resin layer on the surface of the second resin layer.

As such, the surface of the second resin layer means a surface which does not face the first resin layer but is exposed to external environments.

Also, the component of the first resin layer means at least one of components included in the first resin layer.

The details of the first resin, the second resin, the difference in physical properties between the first resin and the second resin, and the polymer having a certain organic functional group included in the second resin have been described above, and thus detailed description thereof is omitted for clarity.

Also, in this specification, the difference in physical properties may refer to a difference in physical properties between the first resin and the second resin, or a difference in physical properties between the first resin layer and the second resin layer.

Furthermore, according to yet another exemplary embodiment of the present application, automotive parts of an automobile, helmets, parts of electronic equipment, parts of a spinning machine, toys and pipes, all of which include the melt-processed resin-molded article, may be provided.

According to the present application, a resin blend for a melting process capable of improving mechanical properties and surface hardness of a molded article and also exhibiting effects of reducing a processing time, enhancing productivity and cutting the production cost by eliminating an additional surface coating step, a pellet, a method of preparing a resin-molded article using the same, and a resin-molded article prepared thereby can be provided.

BRIEF DESCRIPTION OF THE DRAWINGS

The above and other objects, features and advantages of the present application will become more apparent to those of ordinary skill in the art by describing in detail exemplary embodiments thereof with reference to the attached drawings, in which:

FIG. 1 is an SEM image showing a layer-separated cross-section of a molded article prepared in Example 1

DETAILED DESCRIPTION OF EXEMPLARY EMBODIMENTS

Hereinafter, exemplary embodiments of the present application will be described in detail. However, the present application is not limited to the embodiments disclosed below, but can be implemented in various forms. The following embodiments are described in order to enable those of ordinary skill in the art to embody and practice the present application.

Experimental Example 1: Measurement of Glass Transition Temperature

Glass transition temperatures of first resins and second resins used in Examples and Comparative Examples were measured using a differential scanning calorimeter (DSC823e commercially available from Mettler-toledo). More particularly, an aluminum fan containing 1 mg of a sample of a first resin or a second resin was installed in a measuring instrument, and a glass transition temperature of the sample was then measured at a temperature of −50 to 300° C. (at a rate of 10° C./min: 2 cycles).

The glass transition temperature of the first resin used in the present application was 70° C., and the glass transition temperature of the second resin used in each of Examples and Comparative Examples was measured to calculate a difference in glass transition temperature between the first resin and the second resin.

Experimental Example 2: Measurement of Melt Viscosity

Melt viscosities of the first resins, the second resins and the test samples obtained in Examples and Comparative Examples were measured using a capillary rheometer (Capillary Rheometer 1501 commercially available from Gottfert).

More particularly, a capillary die was attached to a barrel, and the second resin, the first resin or the test sample was then put into the barrel in three divided doses. Thereafter, the shear viscosity (Pa*s) of the second resin, the first resin or the test sample was measured at a processing temperature of 240° C. and a shear rate of 100 to 1,000 $s^{-1}$.

Experimental Example 3: Observation of Cross-Sectional Shape

The test samples prepared in Examples and Comparative Examples were subjected to a low-temperature impact test, and fracture surfaces of the test samples were then etched with THF vapor, and layer-separated cross-sectional shapes of the test samples were observed using an SEM.

Meanwhile, to measure thicknesses of the layer-separated first resin layer, second resin layer and interfacial layer, the cross-sections of the test samples prepared in the following Examples and Comparative Examples were cut at a temperature of −120° C. using a diamond blade of microtoming equipment (Leica EM FC6), and smoothed. The microtomed smooth cross-sections of the test samples were dipped in a 1,2-dichloroethane solution (10% in EtOH), etched for 10 seconds, and then washed with distilled water. The different portions of the cross-sections were etched to different extents according to the contents of the first resin and the second resin, and observed using an SEM. That is, the first resin layer, the second resin layer and the interfacial layer may be observed by a shade difference, as viewed from a surface of the test sample at an angle of 45°. Then, the thickness of each layer may be measured using the results.

Experimental Example 4: Experiment for Measuring Impact Strength

Impact strengths of the test samples prepared in Examples and Comparative Examples were measured according to the ASTM D256 standard. More particularly, energy (Kg*cm/cm) required to destroy a test sample having a V-shaped notch when a weight hung on the end of a pendulum was dropped on the test sample was measured using an impact tester (Impact 104 commercially available from Tinius Olsen). The ⅛" and ¼" test samples were measured five times to calculate average energy values.

Experimental Example 5: Experiment for Measuring Pencil Hardness

Surface pencil hardness of the test samples prepared in Examples and Comparative Examples was measured under a constant load of 500 g using a pencil durometer (commercially available from ChungbukTech). Scratches were applied to a reference pencil (commercially available from Mitsubishi) at a constant angle of 45° while altering the pencil hardness from 6B to 9H, and a surface change of the pencil was observed (ASTM 3363-74). The pencil hardness of the test sample was calculated as an average value of the experiments which were performed 5 times.

Experimental Example 6: Surface Analysis Using Infrared Spectrometer (IRS)

An UMA-600 infrared microscope equipped with a Varian FTS-7,000 spectroscope (Varian, USA) and a mercury cadmium telluride (MCT) detector was used, and spectrum measurement and data processing were performed using Win-IR PRO 3.4 software (Varian, USA). The measurement conditions were as follows.

Germanium (Ge) attenuated total reflection (ATR) crystals having a refractive index of 4.0.

Mid-infrared spectra are scanned 16 times using an ATR method with a spectral resolution of 8 $cm^{-1}$ at wavelengths spanning from 4,000 $cm^{-1}$ to 600 $cm^{-1}$.

Internal reference band: carbonyl group of acrylate (C=O str., approximately 1,725 $cm^{-1}$).

Innate component of first resin: butadiene compound [C=C str. (approximately 1,630 $cm^{-1}$) or =C—H out-of-plane vib. (approximately 970 $cm^{-1}$)].

Peak intensity ratios [$I_{BD}$(C=C)/$I_A$(C=O)] and [$I_{BD}$(out-of-plane)/$I_A$(C=O)] were calculated, and spectrum measurements were performed five times on different regions in one sample to calculate an average value and a standard deviation.

Example 1

(1) Preparation of Second Resin 1,500 g of distilled water and 4 g of an aqueous solution including a dispersing agent (2% polyvinyl alcohol) were put into a 3 L reactor, and dissolved. Thereafter, 560 g of methyl methacrylate, 240 g of tert-butyl methacrylate, 2.4 g of a chain transfer agent, n-dodecylmercaptan, and 2.4 g of an initiator, azodiisobutyronitrile, were further added into the reactor, and mixed while stirring at 400 rpm. The resulting blend was reacted at 60° C. for 3 hours to perform polymerization, and cooled to 30° C. to obtain a second resin in the form of beads. Then, the second resin was washed three times with distilled water, dehydrated, and dried in an oven.

(2) Preparation of Resin Blend and Molded Article Using the Resin Blend 7 parts by weight of the second resin was mixed with 93 parts by weight of the first resin (a thermoplastic resin including methyl methacrylate at 60% by weight, acrylonitrile at 7% by weight, butadiene at 10% by weight, and styrene at 23% by weight), and the resulting blend was then extruded at a temperature of 240° C. in a twin screw extruder (commercially available from Leistritz) to obtain a pellet. Thereafter, the pellet was injected at a temperature of 240° C. in an EC100Φ30 injector (commercially available from ENGEL) to prepare a test sample of a resin-molded article having a thickness of 3,200 μm.

(3) Measurement of Physical Properties of Test Sample

The physical properties of the test sample prepared as described above were measured. As a result, it was revealed that the second resin layer had a thickness of 75 μm, the interfacial layer had a thickness of 25 μm, the melt viscosity difference was 300 Pa*s, the second resin had a glass transition temperature ($T_g$) of 106° C., the impact strengths were 7.1 kg·cm/cm in the case of IZOD ⅛" and 6.5 kg·cm/cm in the case of IZOD ¼", the pencil hardness was 2.5H, and the layer separation took place. The peak intensity ratio [$I_{BD}$(C=C)/$I_A$(C=O)] measured by the infrared spectrometer was 0.0125 on average with a standard deviation of 0.0004, and the peak intensity ratio [$I_{BD}$(out-of-plane)/$I_A$(C=O)] was 0.413 on average with a standard deviation of 0.0026.

Example 2

A test sample having a thickness of 3,200 μm was prepared in the same manner as in Example 1, except that 560 g of methyl methacrylate and 240 g of cyclohexyl methacrylate were used as monomers instead of 560 g of methyl methacrylate and 240 g of tert-butyl methacrylate.

The physical properties of the test sample prepared as described above were measured. As a result, it was revealed that the second resin layer had a thickness of 76 μm, the interfacial layer had a thickness of 23 μm, the melt viscosity difference was 410 Pa*s, the second resin had a glass transition temperature ($T_g$) of 102° C., the impact strengths were 8.8 kg·cm/cm in the case of IZOD ⅛" and 9.1 kg·cm/cm in the case of IZOD ¼", the pencil hardness was 2H, and the layer separation took place.

Example 3

A test sample having a thickness of 3,200 μm was prepared in the same manner as in Example 1, except that 560 g of methyl methacrylate and 240 g of phenylmethacrylate were used as monomers instead of 560 g of methyl methacrylate and 240 g of tert-butyl methacrylate.

The physical properties of the test sample prepared as described above were measured. As a result, it was revealed that the second resin layer had a thickness of 79 μm, the interfacial layer had a thickness of 20 μm, the melt viscosity difference was 390 Pa*s, the second resin had a glass transition temperature ($T_g$) of 107° C., the impact strengths were 8.5 kg·cm/cm in the case of IZOD ⅛" and 8.9 kg·cm/cm in the case of IZOD ¼", the pencil hardness was 2H, and the layer separation took place.

Example 4

A test sample having a thickness of 3,200 μm was prepared in the same manner as in Example 1, except that 560 g of methyl methacrylate and 240 g of isobornyl methacrylate were used as monomers instead of 560 g of methyl methacrylate and 240 g of tert-butyl methacrylate.

The physical properties of the test sample prepared as described above were measured. As a result, it was revealed that the second resin layer had a thickness of 76 μm, the interfacial layer had a thickness of 21 μm, the melt viscosity difference was 310 Pa*s, the second resin had a glass transition temperature ($T_g$) of 123° C., the impact strengths were 8.1 kg·cm/cm in the case of IZOD ⅛" and 8.4 kg·cm/cm in the case of IZOD ¼", the pencil hardness was 2H, and the layer separation took place.

Example 5

A test sample having a thickness of 3,200 μm was prepared in the same manner as in Example 2, except that 79 parts by weight of the first resin and 21 parts by weight of the second resin were used instead of 93 parts by weight of the first resin (a thermoplastic resin including methyl methacrylate at 60% by weight, acrylonitrile at 7% by weight, butadiene at 10% by weight and styrene at 23% by weight) and 7 parts by weight of the second resin.

The physical properties of the test sample prepared as described above were measured. As a result, it was revealed that the second resin layer had a thickness of 94 μm, the interfacial layer had a thickness of 65 μm, the melt viscosity difference was 410 Pa*s, the second resin had a glass transition temperature ($T_g$) of 102° C., the impact strengths were 6.7 kg·cm/cm in the case of IZOD ⅛" and 6.8 kg·cm/cm in the case of IZOD ¼", the pencil hardness was 3H, and the layer separation took place.

Example 6

A test sample having a thickness of 3,200 μm was prepared in the same manner as in Example 1, except that 2.4 g of n-dodecylmercaptan and 3.2 g of azobisisobutyronitrile were used instead of 2.4 g of n-dodecylmercaptan and 2.4 g of azobisisobutyronitrile.

The physical properties of the test sample prepared as described above were measured. As a result, it was revealed that the second resin layer had a thickness of 79 μm, the interfacial layer had a thickness of 24 μm, the melt viscosity difference was 360 Pa*s, the second resin had a glass transition temperature ($T_g$) of 105° C., the impact strengths were 4.3 kg·cm/cm in the case of IZOD ⅛" and 4.1 kg·cm/cm in the case of IZOD ¼", the pencil hardness was 2H, and the layer separation took place.

Example 7

A test sample having a thickness of 3,200 μm was prepared in the same manner as in Example 1, except that 400 g of methyl methacrylate and 400 g of cyclohexyl methacrylate were used instead of 560 g of methyl methacrylate and 240 g of tert-butyl methacrylate.

The physical properties of the test sample prepared as described above were measured. As a result, it was revealed that the second resin layer had a thickness of 76 μm, the interfacial layer had a thickness of 25 μm, the melt viscosity difference was 440 Pa*s, the second resin had a glass transition temperature ($T_g$) of 93° C., the impact strengths were 7.1 kg·cm/cm in the case of IZOD ⅛" and 7.0 kg·cm/cm in the case of IZOD ¼", the pencil hardness was 2H, and the layer separation took place.

Comparative Example 1

100 parts by weight of a pellet formed of a first resin (a thermoplastic resin including methyl methacrylate at 60% by weight, acrylonitrile at 7% by weight, butadiene at 10% by weight, and styrene at 23% by weight) was dried in an oven, and injected at a temperature of 240° C. in an EC100Φ30 injector (commercially available from ENGEL) to prepare a test sample having a thickness of 3,200 μm.

The physical properties of the test sample prepared as described above were measured. As a result, it was revealed that the impact strengths were 9.9 kg·cm/cm in the case of IZOD ⅛" and 10.0 kg·cm/cm in the case of IZOD ¼", and the pencil hardness was F.

Comparative Example 2

90 parts by weight of the first resin (a thermoplastic resin including methyl methacrylate at 60% by weight, acrylonitrile at 7% by weight, butadiene at 10% by weight and styrene at 23% by weight) was mixed with 10 parts by weight of PMMA (LGMMA IF870), and the resulting blend was the extruded at a temperature of 240° C. in a twin screw extruder (commercially available from Leistritz) to obtain a pellet. Thereafter, the pellet was injected at a temperature of 240° C. in an EC100Φ30 injector (commercially available from ENGEL) to prepare a test sample having a thickness of 3,200 μm.

The physical properties of the test sample prepared as described above were measured. As a result, it was revealed that the second resin layer had a thickness of 4 μm, the thickness of the interfacial layer was not measurable, the melt viscosity difference was 270 Pa*s, the second resin had a glass transition temperature ($T_g$) of 104° C., the impact strengths were 5.2 kg·cm/cm in the case of IZOD ⅛" and 4.9 kg·cm/cm in the case of IZOD ¼", the pencil hardness was H, and the layer separation did not take place.

Comparative Example 3

A test sample having a thickness of 3,200 μm was prepared in the same manner as in Example 1, except that 560 g of methyl methacrylate and 240 g of normal hexyl methacrylate were used instead of 560 g of methyl methacrylate and 240 g of tert-butyl methacrylate.

The physical properties of the test sample prepared as described above were measured. As a result, it was revealed that the second resin layer had a thickness of 81 μm, the interfacial layer had a thickness of 17 μm, the melt viscosity difference was 460 Pa*s, the second resin had a glass transition temperature ($T_g$) of 62° C., the impact strengths were 9.5 kg·cm/cm in the case of IZOD ⅛" and 9.3 kg·cm/cm in the case of IZOD ¼", the pencil hardness was HB, and the layer separation took place.

Comparative Example 4

100 parts by weight of a pellet formed of a first resin (a thermoplastic resin including methyl methacrylate at 60% by weight, acrylonitrile at 7% by weight, butadiene at 10% by weight, and styrene at 23% by weight) was dried in an oven, and injected at a temperature of 240° C. in an EC100Φ30 injector (commercially available from ENGEL) to prepare a test sample.

The test sample was coated with an anti-pollution hard coating solution (including DPHA at 17.5% by weight, PETA at 10% by weight, perfluorohexylethyl methacrylate at 1.5% by weight, a urethane acrylate (EB 1290 commercially available from SK Cytech) at 5% by weight, methyl ethyl ketone at 45% by weight, isopropyl alcohol at 20% by weight, and a UV initiator (IRGACURE 184 commercially available from Ciba) at 1% by weight), which was prepared by the present inventors to include a multifunctional acrylate, using Mayer bar #9, and then dried at a temperature of 60 to 90° C. for approximately 4 minutes to form a film. Then, the coating composition was cured by irradiation with UV rays at an intensity of 3,000 mJ/cm² to form a hard coating film.

The hard coating film had a pencil hardness of 3H, and both the peak intensity ratios [$I_{BD}$(C=C)/$I_A$(C=O)] and [$I_{BD}$(out-of-plane)/$I_A$(C=O)] measured by the infrared spectrometer were 0 on average with a standard deviation of 0.

As described above, it was confirmed that, when the resin blends prepared in Examples were used, the layer separation between the resin layers took place during a melt processing process, and the high-hardness resin was distributed on a surface of the resin-molded article due to such layer separation, thereby making it possible to exhibit excellent surface hardness without performing an additional coating or painting process.

On the other hand, it was confirmed that use of the resin blends prepared in Comparative Examples did not cause occurrence of the layer separation between the resin layers, and the prepared resin-molded articles also had relatively low surface hardness, and thus could not be generally used for electronic products, automotive parts and the like without performing an additional coating or painting process.

What is claimed is:

1. A resin blend for a melting process comprising a first resin and a second resin,
   wherein the first resin comprises an acrylate-based resin,
   wherein the second resin comprises a (meth)acrylate-based resin to which at least one organic functional group selected from the group consisting of tertiary butyl group, isobornyl group, cyclohexyl group, and phenyl group is introduced, and has a melt viscosity difference of 0.1 to 3,000 Pa*s at a shear rate of 100 to 1,000 s$^{-1}$ at a processing temperature of the resin blend and a glass transition temperature ($T_g$) difference of 10° C. to 100° C. with respect to the first resin,
   wherein the resin blend forms a layer-separated structure in which the second resin forms on a surface of the first resin in the layer-separated structure during melt processing under shear stress,
   wherein the resin blend has an impact resistance of 6.7 to 8.8 kg*cm/cm in an IZOD ⅛" test and of 6.5 to 9.1 kg*cm/cm in an IZOD ¼" test measured according to ASTM D256, and
   wherein the resin blend has a pencil hardness of 2H to 3H measured according to ASTM 3363-74.

2. The resin blend of claim 1, wherein the melt viscosity difference between the first resin and the second resin at the shear rate of 100 to 1,000 s$^{-1}$ at the processing temperature of the resin blend is in a range of 0.1 to 2,000 Pa*s.

3. The resin blend of claim 1, wherein the second resin is a (meth)acrylate-based resin having a tertiary butyl group functional group.

4. The resin blend of claim 1, wherein the second resin is a (meth)acrylate-based resin having an isobornyl functional group.

5. The resin blend of claim 1, wherein the second resin is a (meth)acrylate-based resin having a cyclohexyl functional group.

6. The resin blend of claim 1, wherein the second resin is a (meth)acrylate-based resin having a phenyl functional group.

* * * * *